May 28, 1957   L. E. BILLINGSLEY   2,793,758
MUD AND SAND SEPARATOR FOR WELL DRILLING
Filed March 28, 1956   3 Sheets-Sheet 1
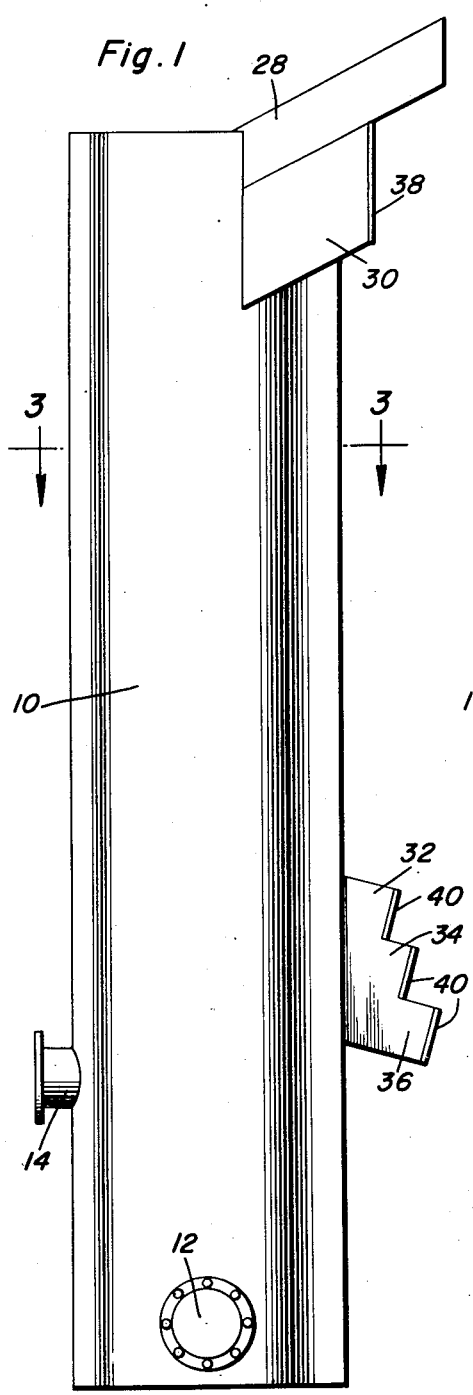
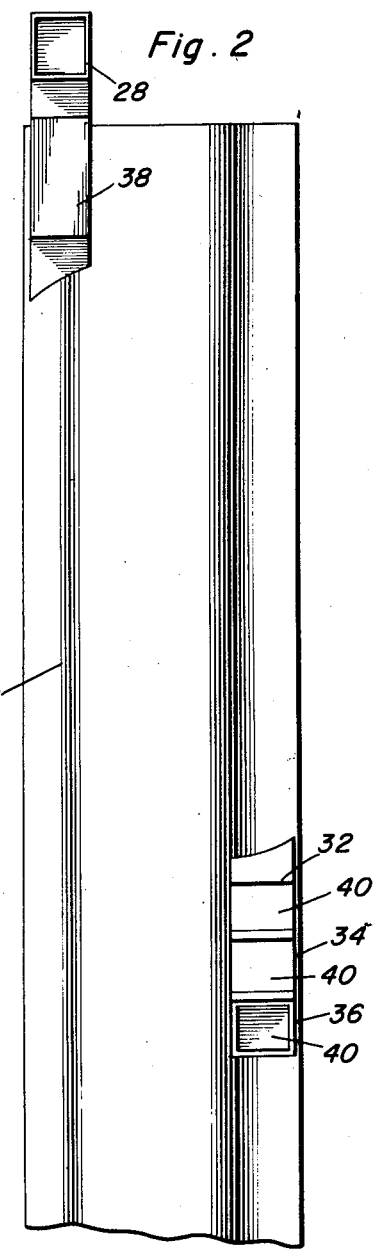
Lewell E. Billingsley
INVENTOR.

May 28, 1957 L. E. BILLINGSLEY 2,793,758
MUD AND SAND SEPARATOR FOR WELL DRILLING
Filed March 28, 1956 3 Sheets-Sheet 2

Lewell E. Billingsley
INVENTOR.

May 28, 1957 L. E. BILLINGSLEY 2,793,758
MUD AND SAND SEPARATOR FOR WELL DRILLING
Filed March 28, 1956 3 Sheets-Sheet 3

Lewell E. Billingsley
INVENTOR.

BY
Attorneys

United States Patent Office 2,793,758
Patented May 28, 1957

2,793,758

MUD AND SAND SEPARATOR FOR WELL DRILLING

Lewell E. Billingsley, Galena Park, Tex.

Application March 28, 1956, Serial No. 574,551

12 Claims. (Cl. 210—512)

This invention comprises novel and useful improvements in a mud and sand separator for well drilling and more particularly relates to an apparatus for effectively cleansing the drilling mud of the foreign matter entrained therein during its circulation through a well bore, in order to prepare the mud for recirculation in a well drilling system.

The primary object of this invention is to provide an apparatus which may be readily incorporated to a conventional mud circulation system for well drilling rigs whereby the contaminated drilling mud issuing from the well bore may be mechanically cleansed by removal therefrom of the entrained sand or other foreign matter and may be rendered thereby fit for recirculation through the fluid circulation system of the drilling rig.

A further object of the invention is to provide an apparatus in accordance with the preceding object which shall be extremely compact in size, shall have no moving parts and shall be extremely efficient for removing sand or foreign matter from drilling fluid.

A further object of the invention is to provide an apparatus in accordance with the foregoing objects which shall occupy relatively little ground area, and shall perform its functions under the influence of gravity.

Yet another object of the invention is to provide an apparatus as set forth in the preceding objects which shall be capable of being easily and readily cleansed of any sand or other material extracted from the drilling mud, when required.

Yet another object of the invention is to provide an apparatus as set forth in the preceding objects wherein the sand and other foreign matter extracted from the mud by the apparatus may be readily subject to inspection continuously during the operation of the apparatus.

A still further object of the invention is to provide a sand and foreign matter separating device for use in a drilling fluid circulating system which will in no way interfere with the customary continuous operation of the circulating system.

And a final important object of the invention to be specifically enumerated herein resides in the provision of an apparatus having means whereby the efficiency of the removal of sand and foreign matter from the drilling fluid may be enhanced through the use of mechanical vibrators associated with the apparatus.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of one suitable form of apparatus in accordance with the principles of this invention;

Figure 2 is a side elevational view, taken at right angles to that of Figure 1, from the right side thereof, parts being broken away;

In modern drilling systems, and especially those employing the rotary method of drilling, a drilling fluid in the form of mud is continuously circulated through the drilling string, the drill bit and from thence upwardly from the bottom of the formation through the well bore to the surface. During its passage from the drilling bit into the bore and upwardly through the bore, the drilling way is contaminated by the particles of the formation separated by the drilling bit, and by sand and other material which may be present in the formation through which the bore penetrates. This foreign matter in the drilling mud must be removed before the mud can be recirculated, since its presence would have a serious detrimental effect upon the various equipment handling and circulating the mud. It is highly desirable that the removal of sand and other foreign matter from the mud shall be effected in a continuous operation in order that the entire process of circulating the drilling mud may be an uninterrupted one.

The accompanying drawings illustrate a suitable form of apparatus in accordance with the principles of this invention for separating sand and other sold foreign matter from the drilling mud without interruption to the flow of the same and in a continuous and highly efficient manner.

The apparatus of the present invention comprises a vertical extending substantially cylindrical housing or casing 10, although it will be understood that other shapes may be utilized if desired. Adjacent the bottom of the housing there is provided a removable man hole cover or cleaning plug 12 whereby access may be had to the interior of the casing for cleaning the same as desired. Extending through the side wall of the casing and positioned above the lower end thereof is an outlet 14 adapted to be connected to any suitable conduit means whereby the purified drilling mud may be discharged from the storage chamber constituted by the interior of the casing.

Figure 5:
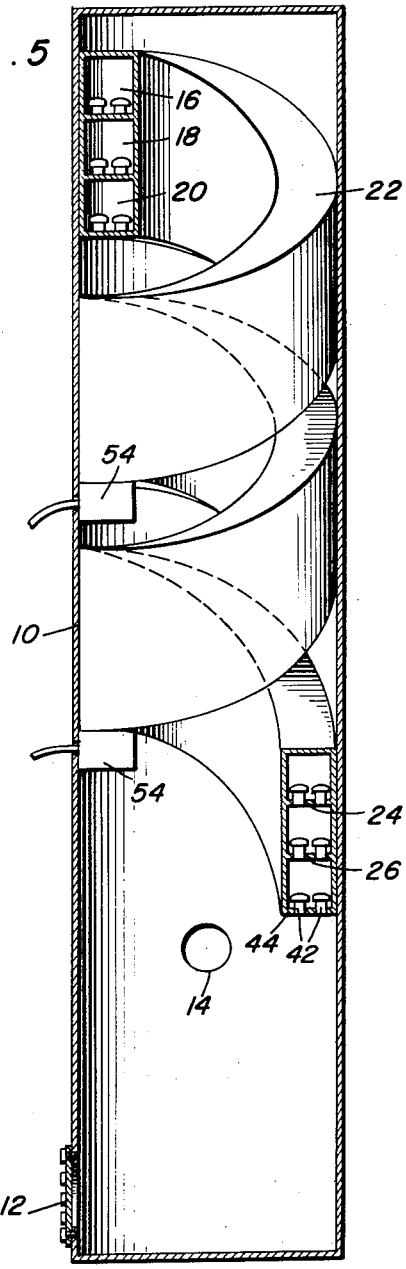
Figure 5 is a view in vertical central section through the apparatus of Figure 1 on line 5—5 of Figure 4.
Figure 6:
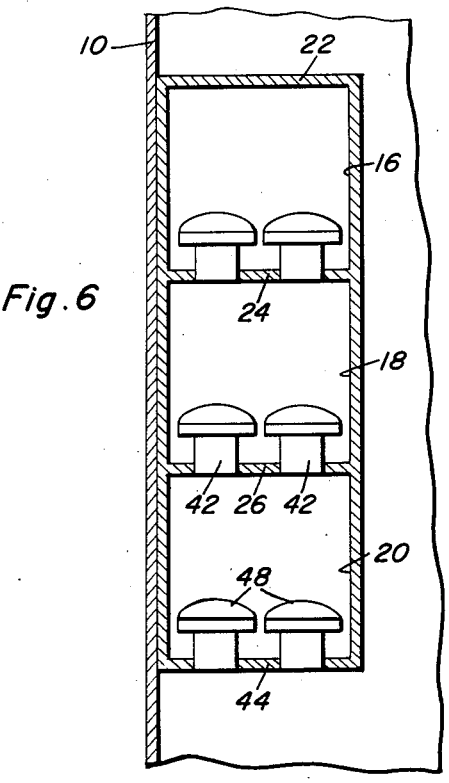
Figure 6 is a detail view taken substantially upon the plane indicated by the section line 6—6 of Figure 3 and showing the relative arrangement of a set of separating passages of the apparatus.

Referring now especially to Figures 5 and 6 it will be seen that the interior of the casing 10 is provided with a plurality of vertically spaced troughs, channels or passages, there being illustrated three such troughs by the numerals 16, 18 and 20 respectively. These passageways, hereinafter referred to as troughs, are inclined from their upper ends to their lower ends, are disposed in overlying relation, and are disposed spirally about the interior of the casing against the side wall of the same as shown in Figure 5. Conveniently, the series of vertically spaced troughs may be formed by a single conduit 22 which is divided by transversely extending partitions 24 and 26 into the above mentioned three vertically spaced passageways or troughs 16, 18 and 20.

As will be apparent from Figures 1 and 2, the upper or inlet ends of the series of troughs and the lower or outlet ends of the troughs extend through the side wall of the casing 10 to the exterior thereof, as shown at 28 and 30 for the upper ends of the series of troughs, and as shown at 32, 34 and 36 for the outlet ends thereof.

As will be observed from Figure 1, the inlet end 28 of the uppermost trough extends farthest from the exterior surface of the casing and is adapted to receive in any suitable manner a continuous flow of the contaminated drilling fluid from the well bore, as the fluid is delivered from the bore by the circulation of the drilling fluid system. The inlet ends of the lower troughs 18 and 20, as shown at 30, are provided with a removable closure gate 38 whereby access may be had to the same for inserting a cleaning element or a cleansing agent for passage through these troughs for cleansing the same of accumulated sediment and foreign matter, as required.

Referring now to the outlet ends 32, 34 and 36 of the troughs, it will be observed that each of these is also provided with a gate or closure 40, which may be removed to permit visual inspection of the foreign matter accumulating therein, and to facilitate cleaning of the same as required.

Figure 3:
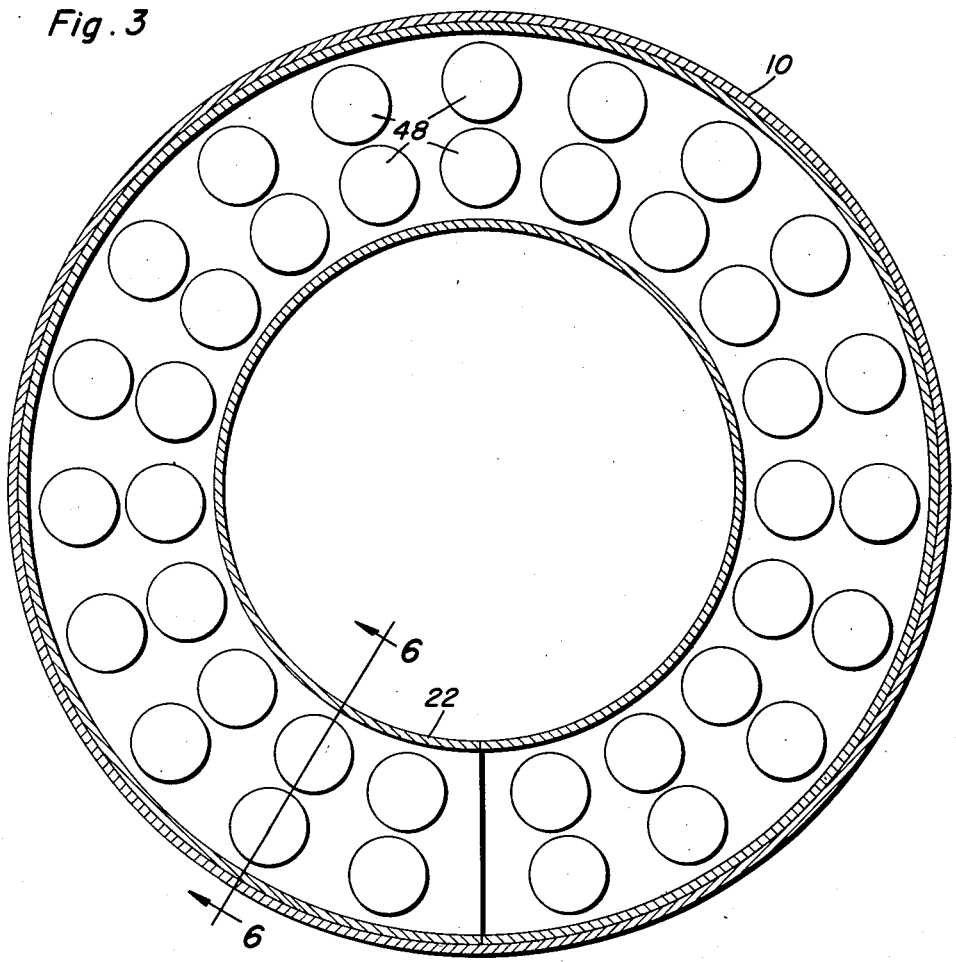
Figure 3 is a horizontal sectional view taken upon an enlarged scale substantially upon the plane indicated by the section line 3—3 of Figure 1 and illustrating a portion of the separating passage of the apparatus.
Figure 7:
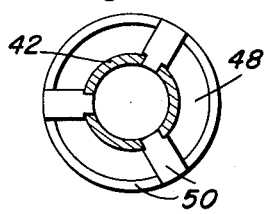
Figure 7 is a horizontal sectional view taken substantially upon the plane indicated by the section line 7—7 of Figure 8 and showing one of the strainer elements of the invention.
Figure 8:
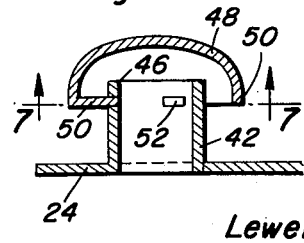
Figure 8 is a vertical sectional view through one of the strainer elements forming a part of the invention.
Figure 4:
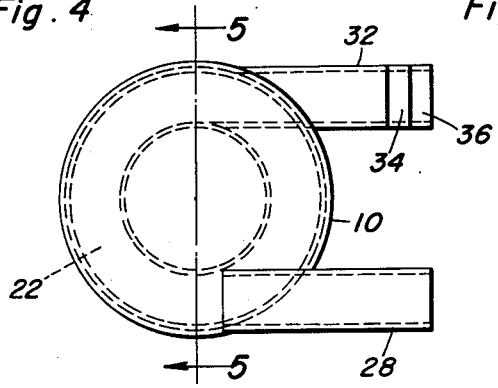
Figure 4 is a top plan view of the apparatus in Figure 1, certain concealed parts being shown in dotted lines therein.

Reference is now made specifically to Figure 6 in conjunction with Figure 5 wherein it will be seen that a separator means is provided for establishing communication between each trough and the trough immediately therebeneath; and between the lowermost trough and the interior of the casing 10. Each separating means, as will be best seen from Figures 7 and 8, consists of a sleeve 42 having its open lower end extending through the bottom wall of the partition 24 or 26, or the bottom wall 44 of the lowermost trough, and which sleeve has an open upper end 46 which extends a considerable distance upwardly within its trough. A cap or cover 48 is provided to overlie the open upper end 46 of each sleeve, this cap consisting of an inverted dish-shaped member having radially inturned projections 50 whose extremities are received in slots 52 formed in the sleeve. It will thus be seen that the central portion of the cap 48 is disposed in spaced relation above the open upper end 46 of the sleeve, while the rim 50 of the cap is spaced laterally from the side of the sleeve and is positioned below the open upper end of the same. By this arrangement, drilling fluid, contaminated with solid foreign matter such as sand, particles of formation cut by the bit and the like, will pass by gravity along the bottom partition or wall 24 of the top trough 16. Owing to the influence of gravity, the foreign matter will tend to settle to the bottom of the trough, while the drilling mud and the fluid components of the same will pass upwardly below the rim 50 of the cap, and overflow into the open upper end 46 of the sleeve, and from thence will pass into the trough immediately therebeneath. There will thus be a settling tendency or a separating effect whereby the fluid material received in the second trough 18 through the strainer means will have considerably less of the solid foreign material than the fluid flowing in the upper trough 16. The same action will take place for each trough so that the fluid passing through the strainers upon the floor or bottom partition of the lowermost trough 20 will be discharged in a substantially purified condition into the chamber formed by the interior of the casing. From the outlet 14, the purified fluid will then be fed to the circulation mud pumps and reintroduced into the circulating system of the drilling rig.

It will be thus seen that there is provided a separating apparatus having no moving parts, and wherein by under the influence of gravity, the fluid component of the drilling mud is separated from the solid foreign material entrained therewith in a continuous operation. From time to time, as cleaning of the separator is necessary, the individual troughs may be cleansed of the solid matter accumulating therein, while the casing may also be cleansed through the man hole opening 12.

Indicated in Figure 5 are a plurality of mechanical vibrators 54 which are placed in contact with any suitable portions of the troughs or the conduit 22 and are actuated either electrically or mechanically as desired. These vibrators serve to agitate the troughs and thus facilitate the sliding or drifting of the solid matter along the inclined bottom walls of each trough towards the outlet of the same. Since the principles of this invention are independent of any particular construction of vibrator, the diagrammatic showing of the same in Figure 5 is believed to be sufficient.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A gravity separator for drilling mud comprising a housing having therein a plurality of vertically spaced inclined troughs, means for introducing drilling mud contaminated with soil foreign matter as sand into the upper end of the uppermost trough, outlet means at the lower end of each trough for removing solid foreign matter therefrom, means for removing purified drilling mud from said housing, gravitational separating means for separating by gravity and educting the drilling mud from each trough and leaving the entrained solid foreign matter thereon, the gravitational separating means discharging drilling mud into the trough next therebeneath and from the lowest trough into said housing.

2. The combination of claim 1 including a mechanical vibrator operatively associated with one of said troughs for agitating the same to cause solid foreign matter therein to migrate to the outlet means thereof.

3. The combination of claim 1 wherein the upper end of each trough extends exteriorly of the casing.

4. The combination of claim 1 wherein the upper ends of each trough below the topmost trough has an inlet means providing access thereinto.

5. The combination of claim 1 wherein the lower end of each trough and their outlet means extend to the exterior of said casing.

6. The combination of claim 1 wherein said troughs are disposed spirally in said casing about the side thereof.

7. The combination of claim 1 wherein said troughs are disposed spirally in said casing about the side thereof and are disposed with their adjacent top and bottom walls in contact.

8. The combination of claim 1 wherein said gravitational separating means comprises a plurality of sleeves extending upwardly from the bottom wall of each trough and being open at each end whereby the gravity separated fluid portion of the contaminated drilling mud may overflow into the upper end of each sleeve while the solid foreign matter will be retained in said trough.

9. The combination of claim 1 wherein said gravitational separating means comprises a plurality of sleeves extending upwardly from the bottom wall of each trough and being open at each end whereby the gravity separated fluid portion of the contaminated drilling mud may overflow into the upper end of each sleeve while the solid foreign matter will be retained in said trough, a cap overlying and spaced above the top of each sleeve.

10. The combination of claim 1 wherein said gravitational separating means comprises a plurality of sleeves extending upwardly from the bottom wall of each trough and being open at each end whereby the gravity separated fluid portion of the contaminated drilling mud may overflow into the upper end of each sleeve while the solid foreign matter will be retained in said trough, a cap overlying and spaced above the top of each sleeve and having a downturned rim spaced from the sleeve and disposed below the top of the sleeve.

11. The combination of claim 1 wherein said gravitational separating means comprises a plurality of sleeves extending upwardly from the bottom wall of each trough and being open at each end whereby the gravity separated fluid portion of the contaminated drilling mud may overflow into the upper end of each sleeve while the solid foreign matter will be retained in said trough, said sleeves being disposed along substantially the entire length and over substantially the entire width of the bottom of each trough.

12. The combination of claim 1 wherein said troughs comprise a single conduit provided with vertically spaced transverse partitions separating the conduit into vertically spaced passages.

References Cited in the file of this patent

UNITED STATES PATENTS

| | | |
|---|---|---|
| 372,216 | Gaillet | Oct. 25, 1887 |
| 870,461 | Pendleton | Nov. 5, 1907 |
| 1,312,027 | Falley | Aug. 5, 1919 |
| 1,677,501 | Stone | July 17, 1928 |
| 1,880,185 | Kern | Sept. 27, 1932 |
| 2,498,292 | Naugle | Feb. 21, 1950 |